United States Patent [11] 3,630,331

| [72] | Inventor | James W. Bradbury |
| | | Middletown, Ohio |
| [21] | Appl. No. | 32,105 |
| [22] | Filed | Apr. 27, 1970 |
| [45] | Patented | Dec. 28, 1971 |
| [73] | Assignee | General Motors Corporation |
| | | Detroit, Mich. |

[54] VISCOUS SHEAR CLUTCH WITH FREE-FLOATING DAMPER RING
6 Claims, 5 Drawing Figs.

[52] U.S. Cl............................................ 192/58 B,
192/82 T
[51] Int. Cl...................................... F16d 35/00
[50] Field of Search........................... 192/58 R,
58 A, 58 B, 58 C, 82 T

[56] References Cited
UNITED STATES PATENTS
3,536,175 10/1970 Kawabe et al. ............... 192/58 B
1,969,755 8/1934 Kellogg ......................... 192/58 B Primary Examiner—Allan D. Herrmann
Attorneys—Warren E. Finken, A. M. Heiter and John P. Moran ABSTRACT: A viscous fluid clutch including relatively rotatable first, second and third drive members having two (2) fluid shear spaces therebetween which are cooperable with a fluid medium in the shear spaces to provide a resultant variable speed differential between the first and third members, an annular reservoir for at times storing the fluid medium, a temperature-responsive valve for controlling the flow of the fluid medium from the annular reservoir through an inlet port to the fluid shear spaces, continually open outlet ports and cooperating pump elements or wipers for forcing the fluid medium from the fluid shear spaces to the reservoir, the second or intermediate drive member being a loose ring member having a fluid shear or "slip-speed" relationship along each face thereof with the adjacent respective first and third drive members for prolonging the operational life of the fluid medium.

PATENTED DEC 28 1971 3,630,331
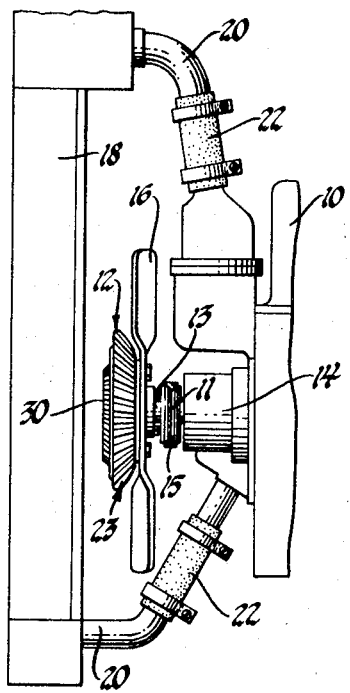
Fig.1
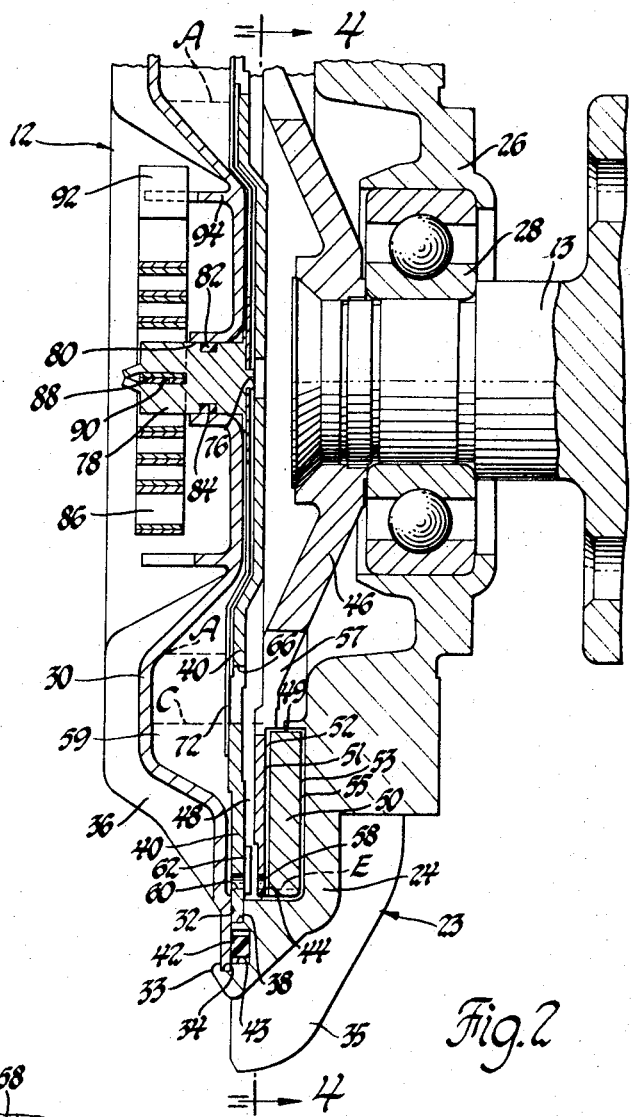
Fig.2
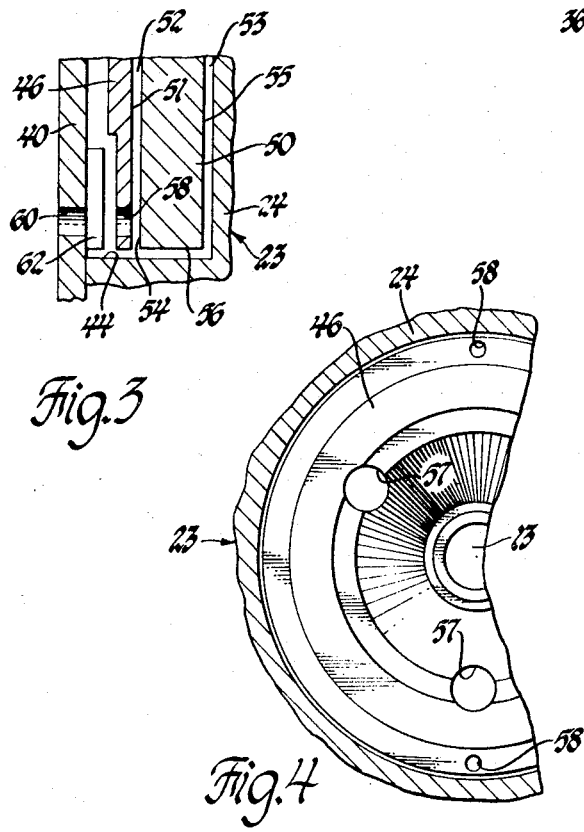
Fig.3
Fig.4
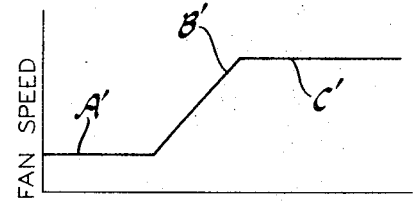
Fig.5
INVENTOR.
James W. Bradbury
BY John P. Moran
ATTORNEY

VISCOUS SHEAR CLUTCH WITH FREE-FLOATING DAMPER RING

This invention relates generally to variable speed drive devices, and more particularly, to a viscous fluid drive adapted to drive an accessory device, such as a cooling fan, for an internal combustion engine.

Vehicle cooling fans are generally belt-driven from the engine crankshaft, and are operable at a fixed speed ratio with respect to the vehicle engine. It has been found desirable to vary the speed ratio of the fan with respect to the engine speed so that at low engine speed the fan will be running at a relatively high speed for maximum cooling and as the speed of the engine increases, such as when the vehicle is running in direct drive at road speeds, the ram air cooling effect on the engine is increased and the necessity for fan cooling is diminished. The resultant lower fan speed eliminates excessive fan noise which otherwise could be disturbing to the occupants of the vehicle.

The device disclosed herein relates to an engine cooling fan mechanism wherein a viscous fluid, shear-type clutch is utilized to transmit power from the vehicle engine to the fan blade assembly.

An object of the invention is to provide a viscous fluid clutch with improved means for improving the operational life of the fluid medium used therein.

Another object of the invention is to provide a viscous fluid clutch including a third drive member loosely mounted intermediate the conventional clutch plate and housing relatively rotatable drive members for accomplishing the shear drive relation between the latter drive members in two lesser shear-rate steps.

A more specific object of the invention is to provide a viscous shear fan drive having a housing including a rear wall, a front wall, a divider wall therebetween, an operating or working chamber formed between the rear and divider walls for receiving a clutch plate, an annular reservoir formed between the divider and front walls, at least one continuously open outlet port formed in the divider wall and cooperating pump or dam means for forcing the fluid from the reservoir and through the outlet port into the operating chamber, a temperature-controlled inlet port formed in the divider wall between the operating chamber and the reservoir, and a ring member mounted for free rotational movement intermediate the clutch plate and the rear wall of the housing for producing a shear-drive relationship with both the clutch plate and the rear wall such that the fluid medium is subjected to a reduced shear-rate for the same relative clutch plate and housing speeds resulting in a prolonged operational life.

These and other objects and advantages will become apparent when reference is made to the following description and accompanying drawings, wherein:

FIG. 1 is a fragmentary side elevational view of a radiator and engine having a viscous fluid clutch-driven cooling fan associated therewith;

FIG. 2 is an enlarged cross-sectional view of a viscous fluid, shear-type clutch embodying the invention;

FIG. 3 is an enlarged fragmentary portion of FIG. 2;

FIG. 4 is a cross-sectional view taken on the plane of line 4—4 of FIG. 2, as if FIG. 2 were a complete and full round view, and looking in the direction of the arrows; and FIG. 5 is a graph illustrating a characteristic of the invention.

Referring to the drawings in greater detail, FIG. 1 illustrates an engine 10 having a viscous fluid clutch 12 and a pulley 11 mounted on a drive shaft 13 extending from the conventional water pump 14, the pulley 11 being rotated by a V-belt 15 connected to the crankshaft (not shown) for driving a cooling fan 16 secured to the clutch 12. The fluid clutch 12 and the cooling fan 16 are located between the engine 10 and a radiator 18. The usual conduits 20 and associated hoses 22 communicate between radiator 18 and the engine 10 adjacent the water pump 14.

Referring now to FIG. 2, the fluid clutch 12 includes a housing 23 which includes a rear wall member 24 having a hub 26 which is rotatably mounted by a suitable bearing 28 on the drive shaft 13. The housing 23 further includes a cover member or front wall 30 which has an annular flat surface 32 formed adjacent its peripheral edge, the latter being confined by an annular lip 33 in an annular recess 34 formed in the housing 23. Cooling fins 35 and 36 are formed on the outer surfaces of the rear wall member 24 and the cover member 30, respectively. A second annular recess 38 is formed radially inward of the outer periphery of the annular recess 34. A divider wall 40 is confined adjacent its outer edge in the second annular recess 38 by the cover member 30. A seal 42 is compressed in an annular groove 43 formed in the rear wall member 24 intermediate the outer edges of the annular recesses 34 and 38. A third annular deeper recess 44 is formed in the rear wall member 24 radially inward of the second annular recess 38. A clutch plate 46 is secured at its center by any suitable means to the drive shaft 13, the outer peripheral portion thereof being freely located in an operating or working chamber 48 formed by the third annular recess 44. A fourth annular recess 49 is formed on the clutch plate 46 adjacent the outer periphery thereof opposite the rear wall 24. A ring member 50 (FIGS. 2 and 3) is freely mounted in the space between the bottom surface 51 of the recess 49 and the rear wall 24 such that a pair of fluid shear spaces 52 and 53 are provided between the surface 51 and a face 54 of the ring member 50 and between the rear wall 24 and the other face 55 of the ring member 50, respectively, to accommodate a viscous fluid as a torque-transmitting medium. A predetermined clearance or peripheral shear space is provided between an outer peripheral bearing surface 56 of the ring member 50 and the recess 44, the thickness of the ring member 50 providing sufficient width for a suitable bearing surface 56.

Referring now to FIG. 4, it may be noted that the clutch plate 46 further includes a plurality of equispaced openings 57 formed therein at a point radially inward from the inner periphery of the ring member 50. A pair of oppositely disposed smaller openings 58 are formed in the clutch plate 46 adjacent the outermost edge thereof, one of which is illustrated as being radially aligned with one of the larger openings 57, but such need not be the case.

It may be noted in FIG. 2 that the front wall or cover member 30 includes an annular bend intermediate the centers and peripheral edges thereof which forms an annular reservoir 59 with the divider wall 40. One or more pump outlet openings 60 are formed through the divider wall 40 circumferentially adjacent the pump or dam elements 62 formed on the divider wall 40, and at substantially the same radial distance from the center of the clutch 12 as the outer clutch plate openings 58. The pump outlet openings 60 communicate between the operating chamber 48 and the annular reservoir 59 and are substantially the same diameter as the clutch plate openings 58. The pump elements 62 may consist of a circular boss formed on the divider wall 40 by any suitable means, such as stamping, or it may be a rectangular-shaped or other-shaped member secured to the divider wall 40, such as by welding. It is to be understood that, in some applications, one outlet and one pump element may be sufficient, while other applications may require two such pumping arrangements. In the latter instance, one of the outlet openings 60 may at times be closed by an internal bimetallic thermostatic valve (not shown).

One or more inlet ports 66 are also formed in the divider wall 40, communicating between the annular reservoir 59 and the working chamber 48 radially inward of the pump elements 62 and the pump outlet openings 60. The inlet port 66 is at times closed off by a valve member 72, which may be responsive to temperature changes or to centrifugal force. The valve member 72 is illustrated as being secured in any suitable manner to a reduced diameter portion 76 of a center pin or shaft 78, which is rotatably mounted in a central opening 80 formed in the front wall or cover member 30. A seal ring 82 may be mounted in an annular groove 84 formed in the pin 78 within the central opening 80 to prevent leakage therepast. A helically wound, bimetallic thermostatic valve control element 86 is provided with an inwardly extending end portion 88 which is mounted in a transverse slot 90 formed in the pin 78. An outwardly extending end portion 92 of the bimetallic element 86 is secured to a post 94. With this arrangement, a change in ambient temperature either winds or unwinds the bimetallic element 86, resulting in rotation of the pin 78 and the valve member 72.

OPERATION

So long as the vehicle engine 10 (FIG. 1) is in operation, the drive shaft 13 and the associated clutch plate 46 (FIG. 2) will be driven by the pulley 11 operatively connected via the belt 15 to the crankshaft (not shown) at an appropriate speed ratio with respect to engine speed. The initial position of the temperature-responsive valve member 72 will be closed across the inlet port or opening 66 in the divider wall 40, and will remain closed so long as the engine is cold, thus preventing any flow of fluid from the annular reservoir 59 into the working chamber 48. Since at least one pump outlet opening 60 is always open, providing continuous communication between the working chamber 48 and the annular reservoir 59, fluid from the working chamber 48 will be pumped therethrough by virtue of the pump elements 62 serving as dams or wipers, forcing the fluid to flow into the respective pump outlet openings 60, and, thence, into the annular reservoir 59. A continual supply of fluid is made available to the wiper elements 72 by virtue of the openings 58 formed in the clutch plate 46. The openings 58 are fed by fluid from radially inwardly thereof under the action of centrifugal force and the effect of suction created by the pumping action of the elements 62 and the outlets 60.

The total volume of fluid is such that when the working chamber 48 is substantially empty, i.e., at a level designated by broken line "E," FIG. 2, at the outermost edge of the openings 58, the fluid in the annular reservoir 59 will be held under the action of centrifugal force in the outer annular portion of the reservoir 59 with an inner annular liquid level "A," FIG. 2, the head resulting from the fluid height "A" to "E" being offset by the force generated by the pumping action of the pump elements 62 on the fluid remaining in the working chamber 48, to prevent any flow-back through the pump outlet openings 60. Under this condition, commonly known as the "disengaged mode," the slip between the clutch plate 46 and the housing 23 is greatest, and fan 16 speed is correspondingly low, as represented by the curve "A'" in FIG. 5.

As the ambient temperature increases due to the warmup of the radiator 18 and engine 10, the bimetallic thermostatic valve control element 86 will begin to wind up and, since it is restrained at its outer end portion 92 by the post 94, its inner end portion 88 will rotate the cooperatively connected pin 78 and the valve member 72, progressively uncovering the inlet ports 66, as will be described. As a result, fluid will flow through the inlet ports 66 back into the working chamber 48, generally progressively increasing the volume therein with increasing temperature. More specifically, as the fluid is admitted through the inlet ports 66 by the temperature-controlled valve element 72, it will first be projected radially outwardly between the divider wall 40 and the adjacent face of the clutch plate 46. It is believed to begin to fill the peripheral clearance between the wall of the annular recess 44 and the outer surfaces of the clutch plate 46 and the ring member 50, while filling radially inwardly between the wall 40 and the adjacent face of the plate 46. Once the fluid attains a level radially within the outer edge of the openings 57 formed in the clutch plate 46, it will spill through the openings 57 into the shear spaces 52 and 53.

The shear spaces 52 and 53 on opposite sides of the ring member 50 are believed to fill radially inwardly at substantially equal rates, thereby progressively varying the relative rotary speeds of the clutch plate 46 and the rear wall member 24 as a result of there being "slip-speed" or shear drive relationships between the face 54 of the ring member 50 and the clutch plate 46 and between the other face 55 of the ring member 50 and the rear wall 24. Referring now to the conventional velocity shear formula, $S=V/h$, wherein "$S$" is the shear rate of a given element of fluid, "$V$" the relative velocity between adjacent drive surfaces, and "$h$" the thickness of the shear space therebetween, it may be realized that if the ring 50 attains a speed intermediate that of the clutch plate 46 and the housing member 24, as is believed to be the case, the shear rate between the surfaces 51/54 and between the surfaces 55/24 would each amount to substantially one-half the shear rate that would result if the ring member 50 were not used and the clutch plate 46 and rear wall member 24 were directly adjacent one another with a shear space therebetween, as has heretofore been the accepted practice. Since the temperature of the fluid medium is known to vary with the shear rate to which it is subjected, it may be realized that such temperature will remain substantially lower by virtue of the two-step shear rate relationship, thereby materially prolonging the operational life of the resultant cooler fluid.

It may be further realized that if multiple rings were used in lieu of the single intermediate ring 50, additional shear-rate steps would result, thereby maintaining the fluid medium at a cooler temperature and further prolonging the operational life thereof.

The intermediate ring 50 will also aid materially in producing a dynamic balancing effect on the clutch 12 by seeking a balanced rotary and axial position intermediate the adjacent clutch plate and rear wall surfaces, thereby minimizing vibration and/or "wobble" conditions which would otherwise adversely affect the conventional associated water pump 14.

Throughout the above, the volume of flow through the continually open outlet ports 60 remains substantially constant, being influenced by the rotary speed of the clutch plate 46, and the working chamber 48 is filled in the manner just described until the inner annular levels in both the working chamber 48 and the annular reservoir 59 are at the level designated by "C," after which the fan 16 speed will remain at its highest constant speed, as represented by the corresponding curve "C'" of FIG. 5.

It is apparent that, as the viscous fluid is admitted to the working chamber 48 with increased temperature, filling the fluid shear spaces 52 and 53, the shear-type fluid drive therebetween will be influenced, and "slip-speed," or the difference between the speed of the clutch plate 46 and that of the housing 23, will decrease, with the fan 16 speed progressively increasing, as indicated by curve "B'" in FIG. 5. So long as the inlet ports 66 remain open, a fluid circulation process will prevail, i.e., the rotating pump or dam elements 62 will continue to promote the flow of fluid from the working chamber 48 through the pump outlet openings 60 to the annular reservoir 59 from whence it will continually return to the working chamber 48 via the variably opening inlet ports 66.

As indicated, when the cooling requirements are at a maximum, the temperature-responsive valve member 72 will have rotated completely past the inlet openings 66, permitting the fluid in the chamber 48 and the reservoir 59 to reach a point of equilibrium, i.e., liquid level "C" in FIG. 2, causing the relatively rotatable drive members 46 and 24 to operate at minimum slip-speed and thereby effecting a maximum cooling function, inasmuch as the fan 16 is secured to the outer portion of the rear wall member 24 of the housing 23 (FIGS. 1 and 2). So long as the inlet ports 66 remain fully open, the circulation process described above will maintain the level "C" illustrated in FIG. 2.

It should be apparent that the invention provides improved means for maintaining the fluid medium at a cooler temperature for conventional "engaged mode" relatively rotatable clutch plate and housing speeds, thereby prolonging the operational life of the fluid medium.

While but one embodiment of the invention has been shown and described, other modifications thereof are possible.

I claim:

1. A viscous fluid clutch comprising first, second and third relatively rotatable drive members, said first drive member having an annular operating chamber and a reservoir chamber formed therein, a predetermined volume of fluid operable in said operating and reservoir chambers, said second and third drive members being mounted in said operating chamber such that said second drive member is freely mounted intermediate said third drive member and an inner wall surface of said first drive member so as to be completely surrounded by said fluid when all of said fluid is in said operating chamber and providing shear spaces adjacent opposite sides of said second drive member, said operating chamber having outlet opening means at an outer portion and inlet opening means at an inner portion, pump means operatively connected to said first drive member to pump said fluid from said operating chamber through said outlet opening means to said reservoir chamber, and said shear spaces on opposite sides of said second drive member providing fluid shear drive relationships between said second drive member and each of said first and third drive members wherein said second drive member rotates at a speed intermediate the speeds of said first and third drive members.

2. A viscous fluid clutch comprising first and second relatively rotatable drive members, a cooperating ring member, said first drive member having an annular operating chamber and a reservoir chamber formed therein, said second drive member and said ring member being mounted in said operating chamber such that said ring member is free-floating intermediate said second drive member and an inner wall surface of said first drive member for providing dynamic balancing during clutch operation and providing shear spaces adjacent opposite sides of said ring member, said operating chamber having outlet opening means at an outer portion and inlet opening means at an inner portion, pump means on said first drive member cooperating with said relatively rotating second drive member to pump said fluid from said operating chamber through said outlet opening means to said reservoir chamber, and said shear spaces on opposite sides of said ring member providing fluid shear drive relationships with said first and second drive members, said shear spaces varying in thickness depending upon the balanced position of said ring member.

3. A viscous fluid clutch comprising a first drive member including a first wall, a second wall and a divider wall sealed between said first and second walls providing a working chamber between said divider and second walls and a second chamber between said first and divider walls, a drive shaft extending into said working chamber, a second drive member mounted on said drive shaft in said working chamber adjacent said divider wall, first opening means in said divider wall for providing communication from said working chamber to said second chamber, pump means on one of said second drive member and said divider wall for causing said fluid medium to flow from said working chamber through said first opening means to said second chamber, second opening means formed in said divider wall for communicating said fluid medium from said second chamber to said working chamber, and a ring member mounted intermediate said second drive member and said second wall of said first drive member and having its inner and outer peripheral surfaces spaced apart from said adjacent drive members for providing a shear drive relationship with each of said second drive member and said second wall to bring said first drive member up to maximum speed at a predetermined ambient temperature.

4. A viscous fluid clutch comprising a drive shaft, first, second and third relatively rotatable drive members, said first drive member including front and rear walls and defining a fluid cavity therebetween, a divider wall sealed between said front and rear walls in said fluid cavity and dividing said fluid cavity into first and second chambers, said rear wall being rotatably mounted on said drive shaft, said second and third drive members being rotatable in said first chamber, said second drive member being a free-floating ring member independent of said drive shaft, said third drive member being secured to said drive shaft, said second drive member and said rear wall and said second drive member and said third drive member having opposed spaced parallel surfaces defining a pair of fluid shear spaces therebetween and cooperable with a fluid medium in said shear spaces to provide shear-type fluid drives therebetween, a first opening formed in said divider wall for providing communication between said first chamber and said second chamber, a dam element formed on said divider wall in said first chamber adjacent said first opening for causing said fluid medium to flow through said first opening for varying the volume of said fluid medium in said shear spaces to vary the torque transmitted between said first and second drive members and between said second and third drive members, a second opening formed in said divider wall for at times communicating said fluid medium from said second chamber to said first chamber, and valve means for controlling the flow of said fluid medium through said second opening to further vary the torque transmitted between said first and second drive members and between said second and third drive members.

5. A viscous clutch comprising first, second and third relatively rotatable drive members, said first drive member including a first wall, a second wall and a divider wall sealed between said first and second walls providing a working chamber between said divider and second walls and a reservoir between said first and divider walls, opposing spaced parallel surfaces on said first, second and third drive members forming a pair of fluid shear spaces in said working chamber operable with a fluid medium to provide a shear-type fluid drive therebetween, said second drive member having a central opening formed therethrough, first opening means formed adjacent an outer edge of said divider wall for providing communication from said working chamber to said reservoir, second opening means formed in said third drive member on the same circle as said first opening means, pump means on one of said divider wall and said third drive member in cooperation with said second opening means for causing said fluid medium to flow from said working chamber through said first opening means to said reservoir, ambient temperature-responsive opening means formed in said divider wall for communicating said fluid medium from said reservoir to said working chamber on the side of said third drive member adjacent said divider wall, a plurality of openings formed in said third drive member equidistant from the center thereof and radially inward of the inner periphery of said second drive member for permitting said fluid medium to spill over from said side of said third drive member adjacent said divider wall to fill said fluid shear space between said second and third drive members with a portion of said fluid medium further spilling through said central opening of said second drive member to fill said shear space between said first and second drive members and thereby causing said second drive member to attain a rotary speed intermediate that of said first and third drive members as a result of said fluid shear drive relationships between opposing sides of said second drive member and said adjacent sides of said first and third drive members.

6. A viscous clutch comprising a housing, a ring member and a clutch plate, said housing, ring member and clutch plate being relatively rotatable, said housing including a first wall, a second wall and a divider wall sealed between said first and second walls providing a working chamber between said divider and second walls and a reservoir between said first and divider walls, opposing spaced parallel surfaces on said housing, ring member and clutch plate forming a pair of fluid shear spaces in said working chamber operable with a fluid medium to provide a shear-type fluid drive therebetween, first opening means formed adjacent an outer edge of said divider wall for providing communication from said working chamber to said reservoir, second opening means formed in said clutch plate on the same circle as said first opening means, pump means on one of said divider wall and said clutch plate in cooperation with said second opening means for causing said fluid medium to flow from said working chamber through said first opening means to said reservoir, ambient temperature-responsive opening means formed in said divider wall for communicating said fluid medium from said reservoir to said working chamber on the side of said clutch plate adjacent said divider wall, a plurality of openings formed in said clutch plate equidistant from the center thereof and located radially inward of the inner periphery of said ring member for permitting said fluid medium to spill over from said side of said clutch plate adjacent said divider wall to fill said fluid shear space between said clutch plate and said ring member with a portion of said fluid medium further spilling over the inner periphery of said ring member to fill the other shear space between said ring member and said second wall and causing said ring member to attain a rotary speed intermediate that of said housing and clutch plate as a result of said fluid shear drive relationships between opposing sides of said ring member and said adjacent sides of said housing and clutch plate, thereby progressively decreasing the speed differential between said housing and clutch plate.

* * * * *